United States Patent
Williams et al.

(10) Patent No.: US 6,846,262 B2
(45) Date of Patent: Jan. 25, 2005

(54) TRANSFER CASE SHIFT SYSTEM FOR CONTROLLABLE BI-DIRECTIONAL OVERRUNNING CLUTCH

(75) Inventors: Randolph C. Williams, Weedsport, NY (US); Aaron Ronk, Lake George, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/721,309

(22) Filed: Nov. 25, 2003

(65) Prior Publication Data

US 2004/0106489 A1 Jun. 3, 2004

Related U.S. Application Data

(63) Continuation of application No. 10/101,885, filed on Mar. 19, 2002, now Pat. No. 6,652,407.
(60) Provisional application No. 60/285,667, filed on Apr. 23, 2001.

(51) Int. Cl.[7] .......................... F16D 40/02; F16D 15/00
(52) U.S. Cl. .......................................... 475/204; 192/38
(58) Field of Search ................................ 192/38, 95 C, 192/79; 475/204, 209, 213, 223; 74/665 F, 665 G, 665 GE; 180/244, 247, 250, 251

(56) References Cited

U.S. PATENT DOCUMENTS

| | | | |
|---|---|---|---|
| 2,391,350 A | 7/1943 | Schmidt | |
| 3,948,372 A | 4/1976 | Hare | |
| 3,949,848 A * | 4/1976 | Fogelber ...................... | 192/38 |
| 4,093,049 A | 6/1978 | Watson et al. | |
| 4,098,379 A | 7/1978 | Fogelberg et al. | |
| 4,138,906 A * | 2/1979 | Nakao et al. ................ | 475/218 |
| 4,361,216 A | 11/1982 | Overbeek | |
| 4,848,508 A * | 7/1989 | Smirl et al. .................. | 180/248 |
| 4,874,056 A | 10/1989 | Naito | |
| 5,363,938 A | 11/1994 | Wilson et al. | |
| 5,407,024 A | 4/1995 | Watson et al. | |
| 5,704,863 A | 1/1998 | Zalewski et al. | |
| 5,924,510 A | 7/1999 | Itoh et al. | |
| 5,951,428 A | 9/1999 | Itoh et al. | |
| 5,993,592 A | 11/1999 | Perego | |
| 6,092,635 A | 7/2000 | McCarthy et al. | |
| 6,123,183 A | 9/2000 | Ito et al. | |
| 6,132,332 A | 10/2000 | Yasui | |
| 6,186,298 B1 | 2/2001 | Wake | |
| 6,367,604 B1 | 4/2002 | Kerr | |
| 6,409,000 B1 | 6/2002 | Itoh et al. | |
| 6,409,001 B1 | 6/2002 | Kerr | |
| 6,427,547 B1 | 8/2002 | Bowen | |
| 6,557,680 B2 | 5/2003 | Williams | |
| 6,612,957 B2 * | 9/2003 | Bansbach et al. ............ | 475/204 |
| 6,709,357 B2 * | 3/2004 | Schleuder et al. ........... | 475/223 |

FOREIGN PATENT DOCUMENTS

DE 684843 12/1939

* cited by examiner

*Primary Examiner*—Roger Pang
(74) *Attorney, Agent, or Firm*—Harness, Dickey & Pierce P.L.C.

(57) ABSTRACT

A controllable, multi-mode, bi-directional overrunning clutch assembly and a shift system adapted for use in a transfer case for transferring drive torque from a primary output shaft to a secondary output shaft so as to establish a four-wheel drive mode. The clutch assembly includes a first ring journalled on a first rotary member, a second ring fixed to a second rotary member, and a plurality of rollers disposed in opposed cam tracks formed between the first and second rings. The first ring is split to define an actuation channel between its end segments. A cam rod is moveable between positions engaged with and released from one or both end segments of the split first ring. The shift system includes a mode fork which controls movement of the cam rod for establishing four distinct operational modes.

39 Claims, 8 Drawing Sheets

TRANSFER CASE SHIFT SYSTEM FOR CONTROLLABLE BI-DIRECTIONAL OVERRUNNING CLUTCH

CROSS-REFERENCE TO RELATED APPLICATIONS

This application is a continuation of U.S. patent application Ser. No. 10/101,885 filed on Mar. 19, 2002, now U.S. Pat. No. 6,682,407 which claims the benefit of U.S. Provisional Application Ser. No. 60/285,667 filed on Apr. 23, 2001.

FIELD OF THE INVENTION

The present invention relates generally to bi-directional overrunning clutch assemblies and, more particularly, to an actively controlled, multi-mode, bi-directional overrunning clutch assembly used in a four-wheel drive transfer case.

BACKGROUND OF THE INVENTION

Four-wheel drive vehicles are in great demand since consumers desire the enhanced on-road and off-road traction control they provide. In many four-wheel drive vehicles, a transfer case is installed in the drivetrain and is normally operable to deliver drive torque to the primary driveline for establishing a two-wheel drive mode. The transfer case is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically in response to lost traction of the primary driveline. An example of passively-controlled on-demand transfer case is shown in U.S. Pat. No. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with such actively-controlled on-demand clutch control systems, recent efforts have been directed to the use of overrunning clutches that can be controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly noted to be operable in vehicular power transmission mechanisms. Likewise, U.S. Pat. Nos. 5,924,510, 5,951,428, 6,123,183, and 6,132,332 each disclose a controllable multi-mode overrunning clutch installed in a transfer case and actuated using an electromagnetic clutch.

However, controllable overrunning clutch assemblies do not always provide predictable vehicle handling characteristics or the required durability necessary for use in modern four-wheel drive vehicles. Thus, a need exists to continue development of controllable bi-directional overrunning clutch assemblies which provide improved structure, robust operation, and reduced packaging for use in on-demand transfer cases.

SUMMARY OF THE INVENTION

The present invention is directed to a controllable, multi-mode, bi-directional overrunning clutch assembly and a shift system adapted for use in a transfer case for transferring drive torque from a primary output shaft to a secondary output shaft so as to establish a four-wheel drive mode. The clutch assembly includes a first ring journalled on a first rotary member, a second ring fixed to a second rotary member, and a plurality of rollers disposed in opposed cam tracks formed between the first and second rings. The first ring is split to define an actuation channel between its end segments. A cam rod is moveable between positions engaged with and released from one or both end segments of the split first ring. The shift system includes a mode fork which controls movement of the cam rod for establishing four distinct operational modes; on-demand 4WD-forward mode; an on-demand 4WD-reverse mode; a part-time 4WD mode (both directions); and a 2WD mode (both directions).

The transfer case of the present invention also includes a two-speed gearset and a range sleeve that is moveable for establishing high and low-range drive connections. In such two-speed transfer cases, the shift system also functions to coordinate movement of the cam rod and the range sleeve to establish various combinations of speed ranges and drive modes.

In accordance with one embodiment of the present invention, the first ring is journalled on the secondary output shaft and the second ring is fixed to a rotary component of a transfer assembly driven by the primary output shaft. Thus, the invention provides for installing the controllable, multi-mode, bi-directional overrunning clutch in association with the front output shaft to permit significant axial length reductions for the transfer case.

Thus, it is an object of the present invention to provide an on-demand transfer case equipped with a controllable, multi-mode, bi-directional overrunning clutch that advances the state of the four-wheel drive technology.

It is a further object of the present invention to provide a power-operated actuator for controlling shifting of the clutch assembly between its distinct modes in response to various sensor signals received by a controller unit.

Further objects, advantages and features of the present invention will become readily apparent to those skilled in the art by studying the following description of the preferred embodiment in conjunction with the appended drawings which are intended to set forth the best mode currently contemplated for carrying out the present invention.

DETAILED DESCRIPTION OF THE PREFERRED EMBODIMENT

Figure 1:
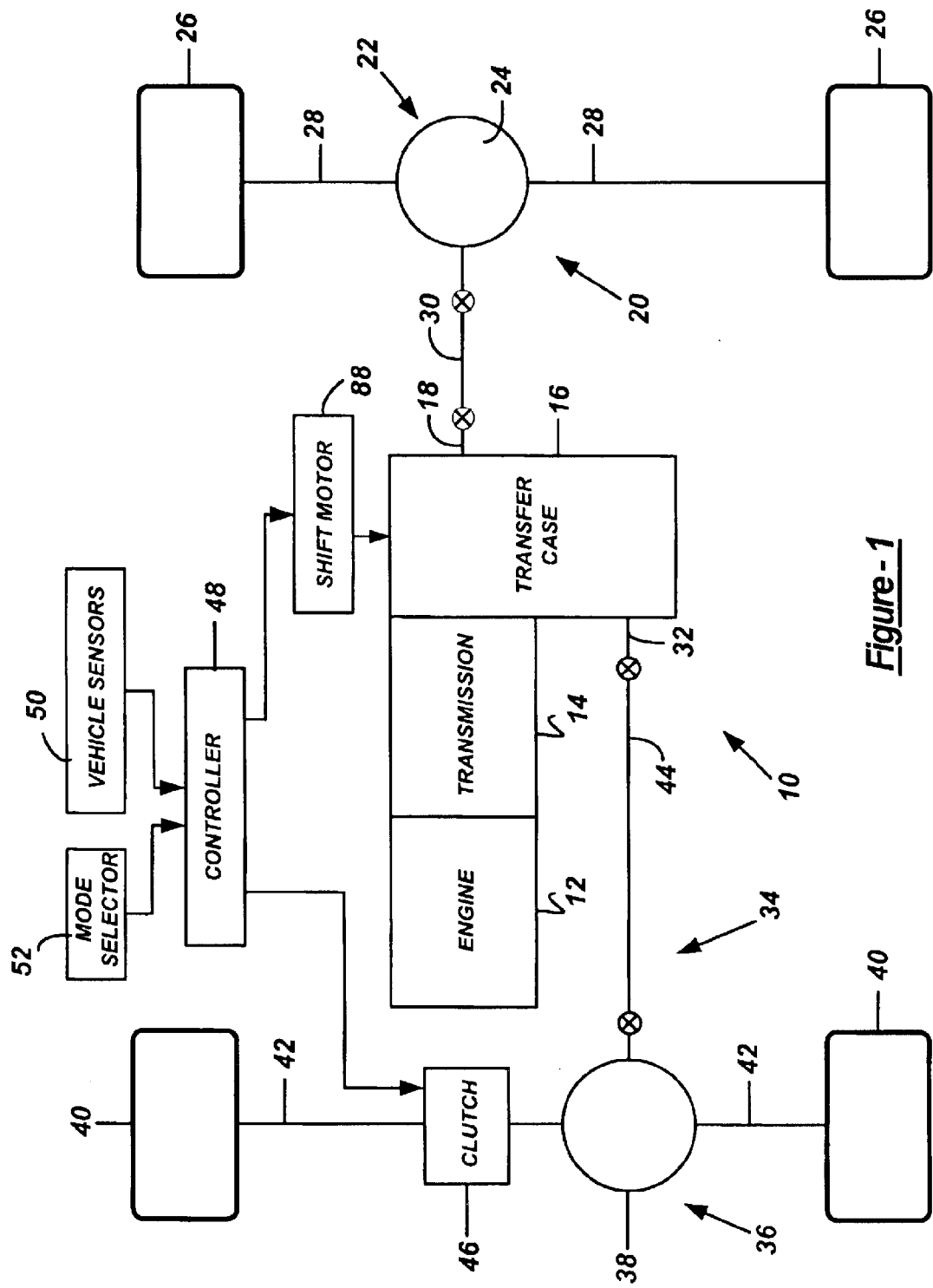
FIG. 1 is a schematic view of a four-wheel drive motor vehicle equipped with a transfer case constructed according to the present invention.

Referring now to FIG. 1, a drive system 10 for a four-wheel drive motor vehicle is shown to include a power source, such as engine 12, which drives a conventional transmission 14 of either the manually-shifted or automatic type. The output shaft of transmission 14 drives an input member of a transfer case 16 which, in turn, delivers drive torque to a primary output shaft 18 that is operably connected to a primary driveline 20. Primary driveline 20 includes an axle assembly 22 having a differential 24 driving a pair of wheel assemblies 26 via axleshafts 28, and a drive shaft 30 connected between primary output shaft 18 and differential 24.

Transfer case 16 further includes a secondary output shaft 32 that is operably connected to a secondary driveline 34. Secondary driveline 34 includes an axle assembly 36 having a differential 38 driving a pair of wheel assemblies 40 via axleshafts 42, and a driveshaft 44 connected between secondary output shaft 32 and differential 38. An axle disconnect clutch 46 is provided for selectively coupling axleshafts 42 to differential 38. When disconnect clutch 46 is released, secondary driveshaft 44 and secondary output shaft 32 are disconnected from the remainder of secondary driveline 34 and are not rotatably driven by rolling movement of wheels 40. Alternatively, locking hubs (not shown) may be used to selectively couple and uncouple wheels 40 from connection with axleshafts 42.

Drive system 10 also includes an electronic controller 48 which receives input data from various vehicle sensors 50 and a mode selector 52. Controller 48 uses the input data from sensors 50 and mode selector 52 to generate control signals used to actuate one or more controllable systems associated with transfer case 16 and disconnect clutch 46, which will be detailed hereinafter. According to the arrangement shown, primary driveline 20 is the rear driveline of a rear wheel drive vehicle while secondary driveline 34 is its front driveline. Drive torque is normally supplied to rear driveline 20 and is only transferred to front driveline 34 when mode selector 52 signals operation in one of an "on-demand" or a "part-time" four-wheel drive mode. However, it will be understood that the teachings of the present invention could easily be adapted for use in a front wheel drive vehicle in which the front driveline would be designated as the primary driveline.

Figure 2:
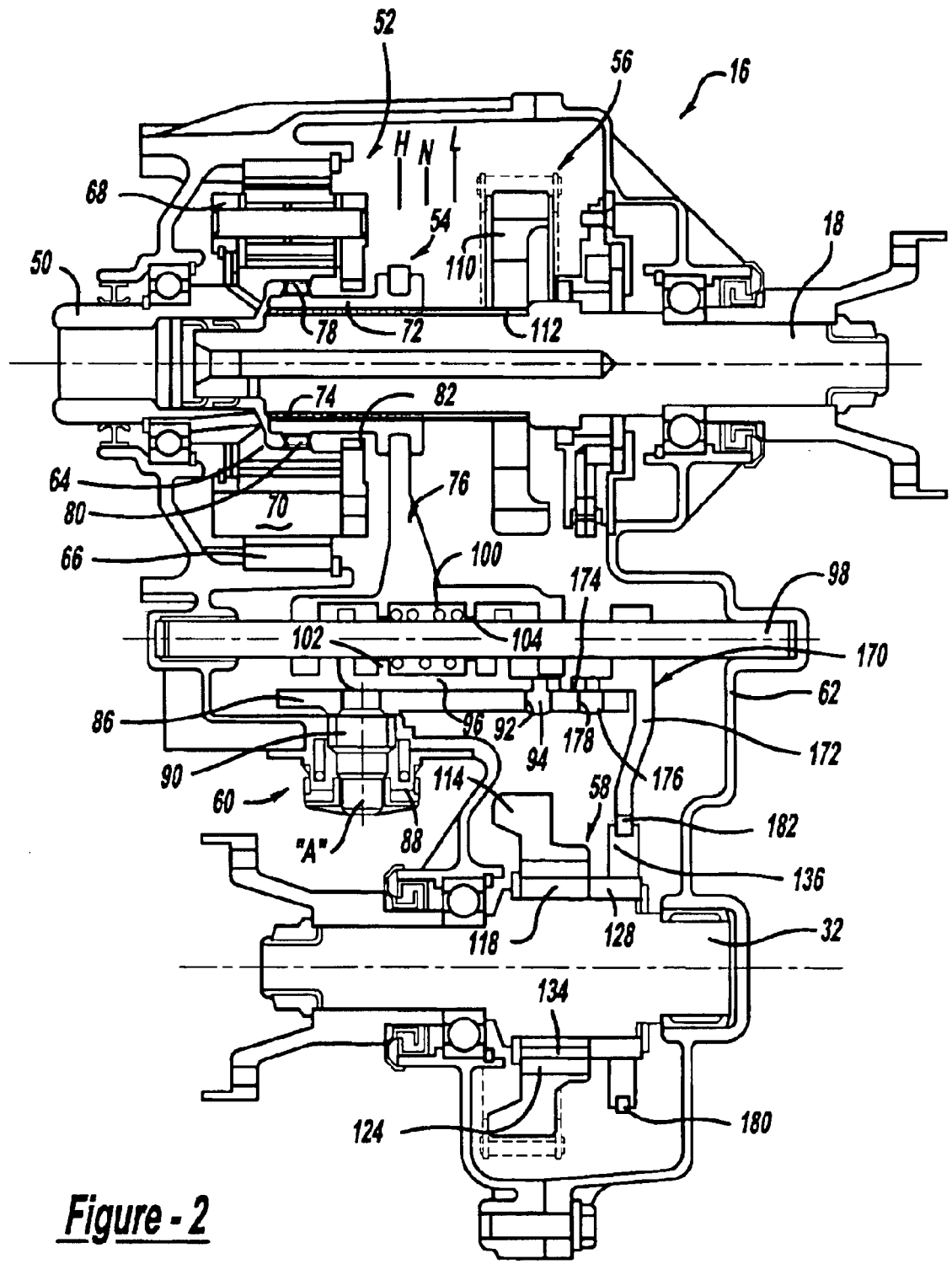
FIG. 2 is a sectional view of the transfer case equipped with a controllable, multi-mode, bi-directional overrunning clutch assembly and shift control system of the present invention.

Referring primarily to FIG. 2, transfer case 16 is shown to generally include an input shaft 50, rear output shaft 18, a planetary reduction gearset 52, a range clutch 54, front output shaft 32, a transfer assembly 56, a bi-directional clutch assembly 58, and a shift system 60, all of which are mounted with a housing assembly 62. Input shaft 50 is adapted for connection to the output shaft of transmission 14. Planetary gearset 52 includes a sun gear 64 fixed for rotation with input shaft 50, a ring gear 66 non-rotatably fixed to housing assembly 62, and a plurality of planet gears 68 rotatably supported on a planet carrier 70. Range clutch 54 includes a range collar 72 fixed via a splined connection 74 for rotation with and axial bi-directional movement on rear output shaft 18. Range collar 72 is moveable between a high-range (H) position, a neutral (N) position, and a low-range (L) position via axial translation of a range fork 76. In the H position, clutch teeth 78 on range collar 72 engage internal clutch teeth 80 on input shaft 50 so as to establish a direct ratio drive connection between input shaft 50 and rear output shaft 18. In the L position, clutch teeth 78 on range collar 72 engage internal clutch teeth 82 on planet carrier 70 so as to establish a reduction ratio drive connection such that rear output shaft 18 is driven at a reduced speed ratio relative to input shaft 18. In the N position, range collar 72 is disengaged from coupled engagement with both input shaft 78 and planet carrier 70 such that no drive torque is transmitted from input shaft 50 to rear output shaft 18.

The position of range fork 76 and range collar 72 are controlled by a sector plate 86 and an electric gearmotor/encoder assembly 88 that are associated with shift system 60. Sector plate 86 is rotated about on axis "A" by and output shaft 90 of motor assembly 88. Sector plate 86 has a contoured range slot 92 within which a follower pin 94 is retained. Follower pin 94 is fixed to a shift bracket 96 which is retained for sliding movement on a shift rail 98 that is fixed to housing assembly 62. Range fork 76 has a C-shaped end section retained in an annular groove formed in range collar 72. A biasing spring 100 surrounds shift rail 98 and its opposite ends engage laterally-spaced pairs of lugs 102 and 104 formed respectively on bracket 96 and range fork 76. The contour of range slot 92 is configured to axially translate bracket 96 in response to rotation of sector plate 86. Spring 100 functions as a resilient energy storage coupling between bracket 96 and range fork 76 that allows rapid and smooth engage of clutch teeth 78 on range collar 72 with the clutch teeth on one of input shaft 50 and planet carrier 70 after a "block out" condition has been eliminated to complete the selected range shift.

It will be appreciated that planetary reduction gearset 52, range collar 72, range fork 76 and its corresponding connection to sector plate 86, which function to provide a two-speed (i.e., high-range and low-range) capability to transfer case 16 are optional such that transfer case 16 could be functional as a one-speed direct drive unit. Moreover, the non-synchronized range shift system disclosed could alternatively be replaced with a synchronized range shift system to permit "on-the-move" shifting between high and low-range without the need to stop the vehicle. Commonly-owned U.S. Pat. Nos. 5,911,644, 5,957,429, and 6,056,666 disclose synchronized range shaft systems that are readily adapted for use with transfer case 16 and which are hereby incorporated by reference.

Transfer assembly 56 is driven by rear output shaft 18 and is shown to include a first sprocket 110 fixed via a splined connection 112 to rear output shaft 18, a second sprocket 114 rotatably mounted on front output shaft 32, and a power chain 116 meshed with both sprockets 110 and 114. Clutch assembly 58 is provided for selectively coupling second sprocket 114 to front output shaft 32 for transferring drive torque from rear output shaft 18 through transfer assembly 56 to front output shaft 32. Clutch assembly 58 is a controllable, multi-mode, bi-directional overrunning clutch installed between second sprocket 114 and front output shaft 32. Clutch assembly 58 includes an inner ring 118 having an inner surface 120 concentrically mounted on an outer surface 122 of front output shaft 32, and an outer ring 124 formed as an axial hub extension of second sprocket 114. Inner ring, hereinafter referred to as slipper ring 118, is a split ring having an actuation slot 125 defining a pair of first and second upstanding lugs 126 and 128, respectively. A series of axially-extending arcuate cam tracks 130 are continuously formed in an outer surface of slipper ring 118 while a corresponding plurality of axially-extending arcuate cam tracks 132 are continuously formed in an inner surface of outer ring 124. A like plurality of elongated cylindrical rollers 134 are retained within aligned cam tracks 130 and 132.

Clutch assembly 58 also includes an actuator ring 136 that is fixed for rotation and axial sliding movement on an axial extension 138 of second sprocket 114 via a splined connection. In particular, ring 136 has a central aperture formed with internal splines that are meshed with external splines formed on the cylindrical axial extension segment 138 of second sprocket 114. An elongated cam rod 140 has one end fixed to a front face of actuator ring 136 and is retained in an axial guide slot 142 formed through outer ring 124.

As best seen from FIGS. 3, 5, 7, and 9, guide slot 142 in outer ring 124 and actuation slot 125 in slipper ring 118 are aligned to define a generally rectangular chamber through which cam rod 140 travels. Cam rod 140 has a first ramped edge segment 144 formed along a first edge surface 146 thereof which is adapted to engage or be positioned in close proximity to first lug 126 of slipper ring 118 when actuator ring 136 is located in a first mode position. A non-ramped intermediate segment 148 of cam rod 140 has its opposite edge surfaces 146 and 150 displaced from engagement with first lug 126 and second lug 128, respectively, when actuator ring 136 is located in a second mode position. Cam rod 140 also has a second ramped edge segment 152 formed along its second edge surface 150 which is adapted to engage or be positioned in close proximity to second lug 128 of slipper ring 118 when actuator ring 136 is located in a third mode position. Finally, a third ramped edge segment 154 is formed along edge surface 146 of cam rod 140 which works in conjunction with a continuation of second ramped edge segment 152 to engage or be positioned in close proximity to lugs 126 and 128, respectively, of slipper ring 118 when actuator ring 136 is located in a fourth mode position.

To provide means for moving actuator ring 136, shift system 60 further includes a mode fork 170 that is supported for axial translation on shift rail 98. In particular, mode fork 170 includes a plate segment 172 from which a flange segment 174 extends. One end of plate segment 172 is journalled on shift rail 98 while flange segment 174 is shown to have a follower pin 176 fixed thereto. Follower pin 176 is retained in a contoured mode slot 178 formed in sector plate 86. The contour of mode slot 178 is configured to axially translate mode fork 170 in response to rotation of sector plate 86 about the "A" axis. The opposite end of plate segment 172 includes a C-shaped fork segment 180 that is retained in an annular circumferential groove 182 formed in actuator ring 136. Thus, axial movement of mode fork 170 causes corresponding axial movement of actuator ring 136. Furthermore, the contour of mode slot 178 works in concert with the contour of range slot 92 to coordinate movement of both mode fork 170 and range fork 76 so as to permit establishment of a plurality of distinct operational modes and speed ranges.

Figure 3:
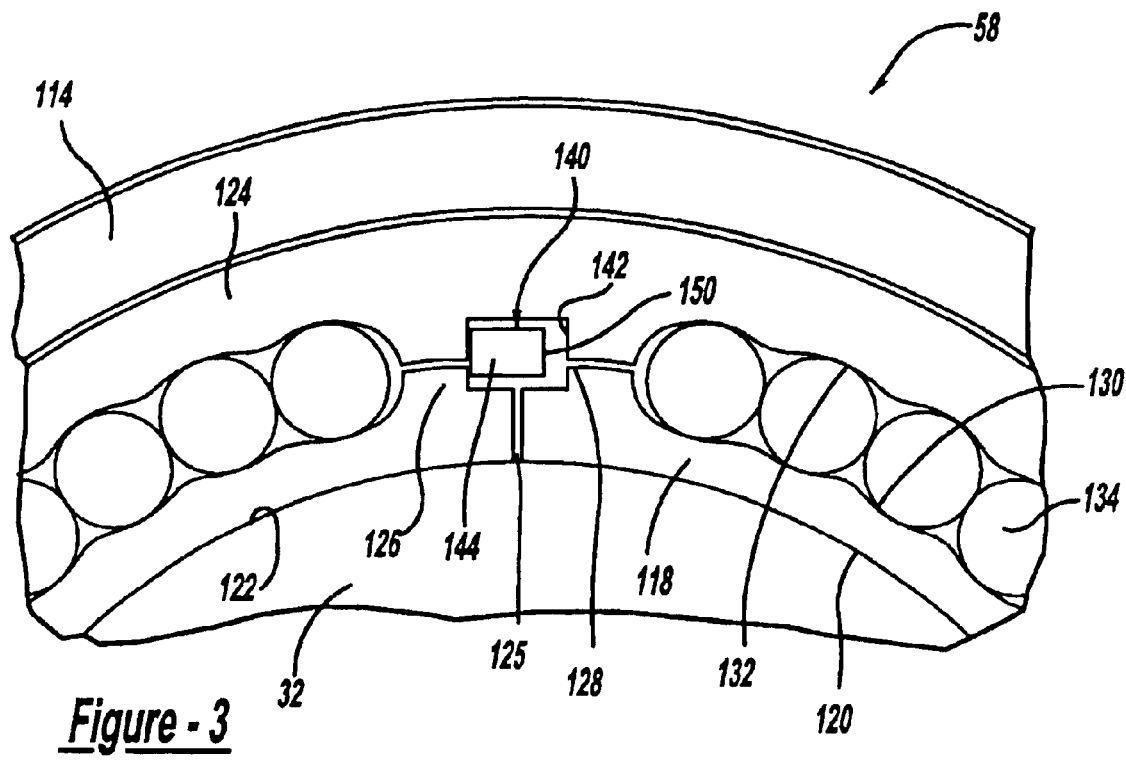
FIG. 3 is a partial sectional view of the bi-directional clutch assembly shown in FIG. 2.
Figure 4:
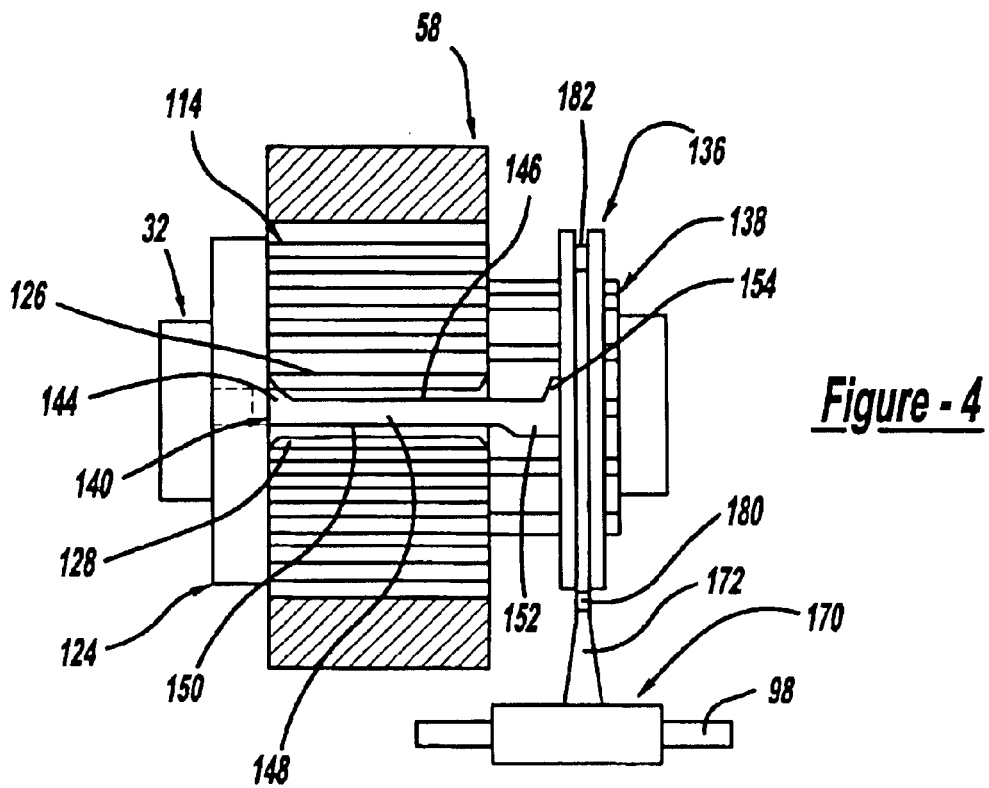
FIG. 4 is a plan view showing the mode actuator in a first position for establishing an on-demand four-wheel drive mode during forward travel of the vehicle.

Referring now to FIGS. 3 and 4, actuator ring 136 is shown in its first mode position such that first ramped edge segment 144 is located adjacent to first lug 126 of slipper ring 118. In this position, first ramp segment 144 prevents rotation of slipper ring 118 in a first direction (i.e., clockwise) relative to outer ring 124 while permitting limited rotation of slipper ring 118 in a second direction (i.e., counter clockwise) relative to outer ring 124. Since outer ring 124 is driven by rear output shaft 18 via transfer assembly 56, and slipper ring 118 is mounted on front output shaft 32, clutch assembly 58 is maintained in an unlocked condition during relative rotation in the first direction and automatically locks in response to relative rotation in the second direction. Specifically, first ramped edge segment 144 maintains alignment between inner ring 118 and outer ring 124 which acts to maintain rollers 134 centrally located in cam tracks 130 and 132 such that slipper ring 118 is not frictionally clamped to front output shaft 32, thereby allowing front output shaft 32 to overrun rear output shaft. However, if traction is lost at rear wheels 26 and rear output shaft 18 attempts to overrun front output shaft 32, slipper ring 118 moves in the second direction relative to outer ring 124. This limited relative rotation causes rollers 134 to ride up cam surfaces 130 and 132 which acts to frictionally clamp slipper ring 118 to front output shaft 32, thereby locking clutch assembly 58 for transferring drive torque from rear output shaft 18 through transfer assembly 56 and clutch assembly 58 to front output shaft 32. This one-way locking function establishes an on-demand four-wheel drive mode during forward motion of the vehicle since front output shaft 32 is coupled for rotation with rear output shaft 18. Once the traction loss has been eliminated, clutch assembly 58 is self-releasing to return operation to an unlocked mode.

Figure 5:
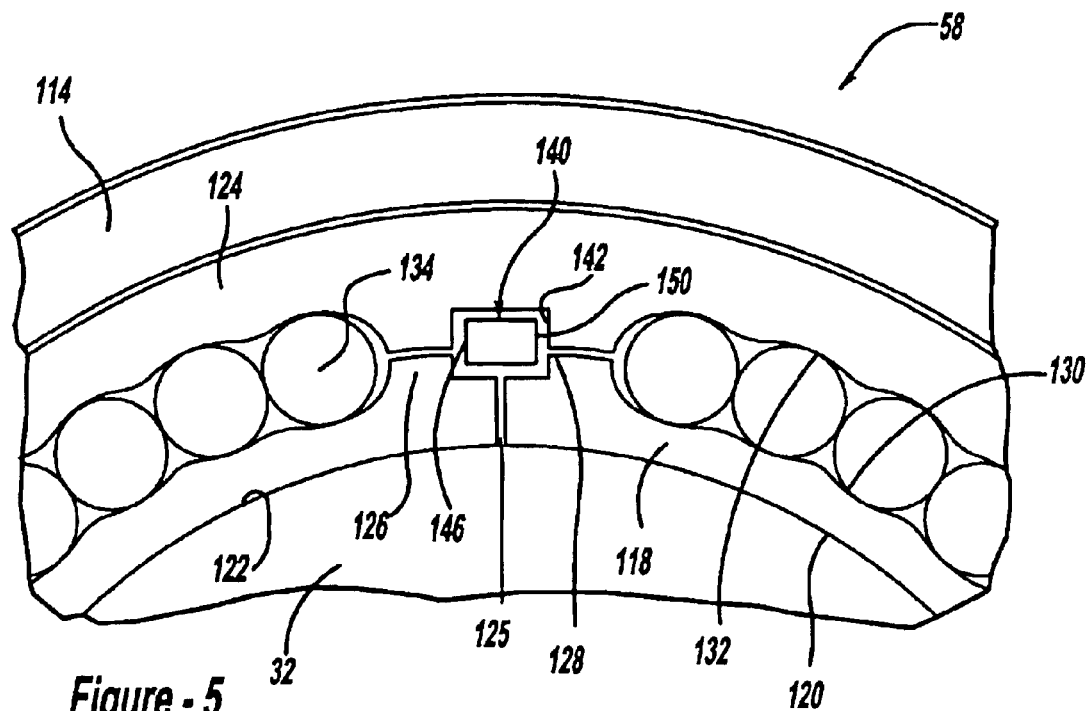
FIGS. 5 and 6 are similar to FIGS. 3 and 4, respectively, but with the mode actuator in a second position for establishing a locked four-wheel drive mode.
Figure 6:
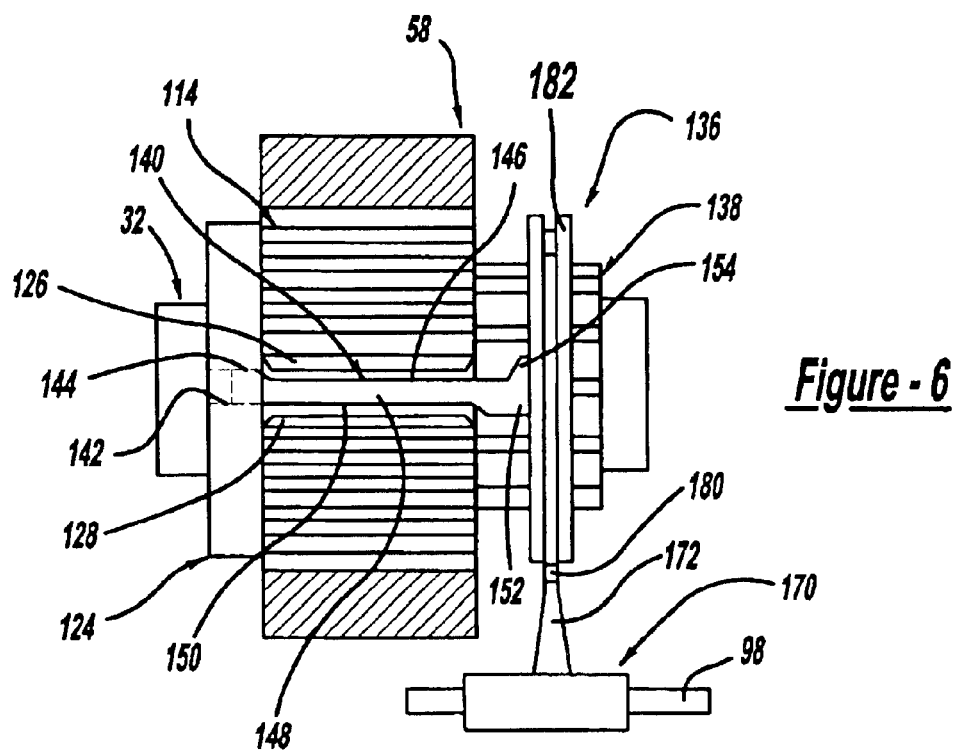
Figure 7:
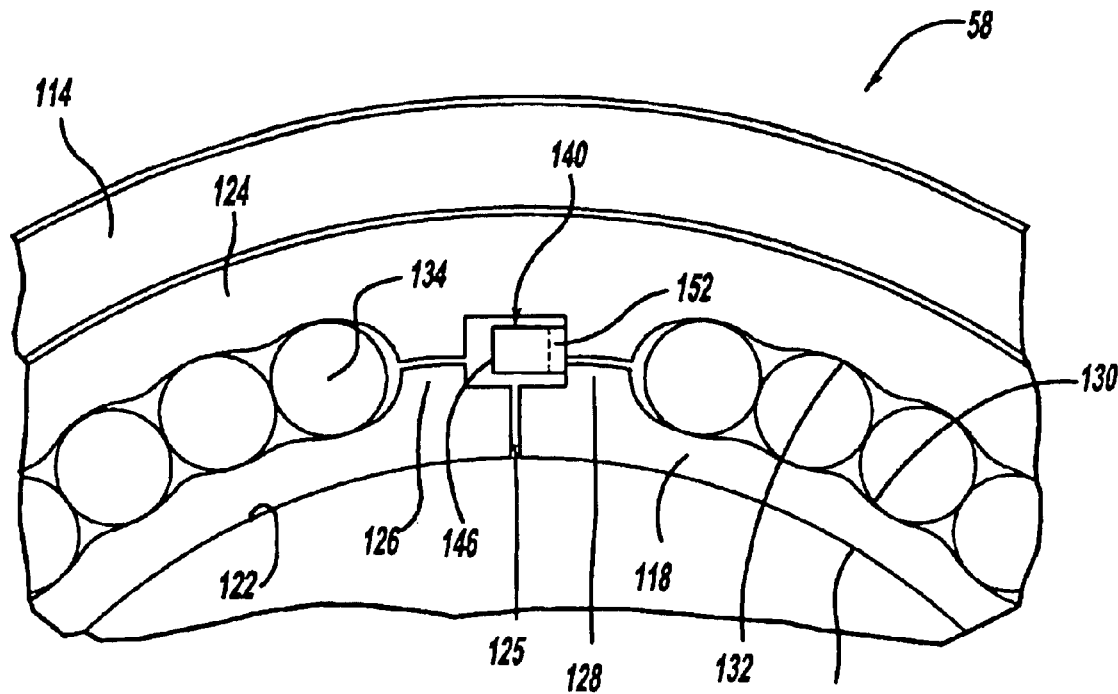
FIGS. 7 and 8 are similar to FIGS. 3 and 4, respectively, but show the mode actuator in a third position for establishing an on-demand four-wheel drive mode during reverse travel of the vehicle.
Figure 8:
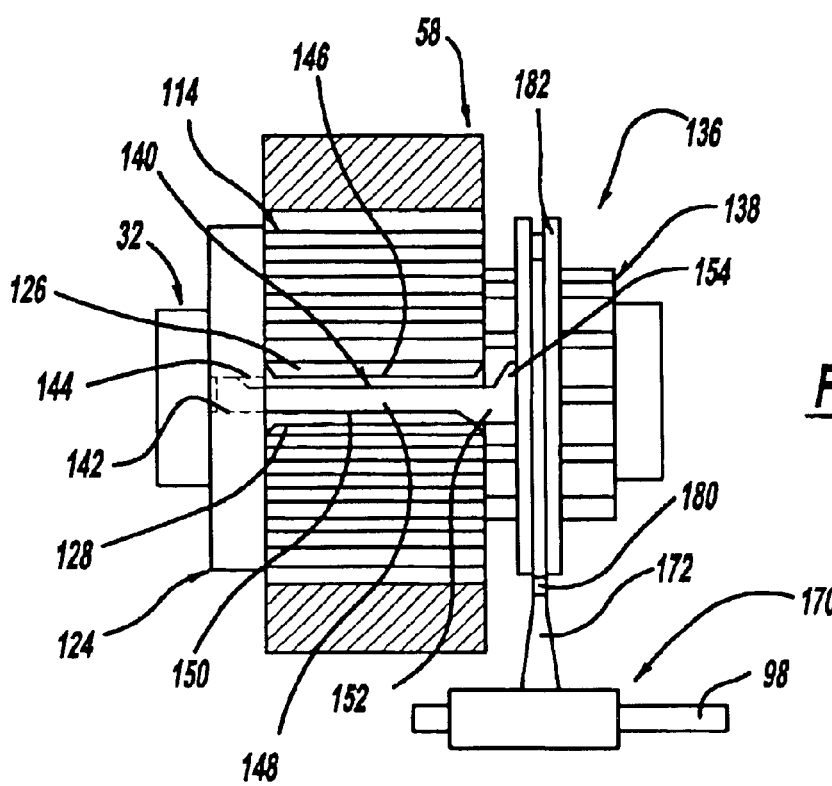

Movement of actuator ring 136 from its first mode position to its second mode position acts to advance cam rod 140 in guide slot 142 such that first ramped edge segment 144 is displaced from first lug 126 of slipper ring 118. As seen in FIGS. 5 and 6, planar edges 146 and 150 of intermediate segment 148 of cam rod 140 are displaced from corresponding lugs 126 and 128 of slipper ring 118. As such, limited relative rotation between slipper ring 118 and outer ring 124 is permitted in both directions, thereby causing automatic locking of clutch assembly 58 in both directions. Thus, a locked or "part-time" four-wheel drive mode is established with second sprocket 114 clutched to front output shaft 32 regardless of the travel direction of the vehicle.

Thereafter, movement of actuator ring 136 from its second mode position to its third mode position acts to further advance cam rod 140 in guide slot 142 such that second ramped edge segment 152 is located adjacent to second lug 128 of slipper ring 118. This arrangement is the reverse of that shown (in FIGS. 3 and 4) and described for the first mode position such that limited relative rotation is permitted between slipper ring 118 and outer ring 124 in the first direction but prevented in the second direction. As such, an on-demand four-wheel drive mode is established for use during reverse travel of the vehicle. This on-demand mode also permits front output shaft 32 to overrun rear output shaft 18 during tight cornering while clutch assembly 58 locks to transfer drive torque to front output shaft 32 during lost traction at the rear wheels. Mode fork 170 is moved between its first and third mode positions by controlled rotation of sector plate 86 via actuation of motor assembly 88 based on a transmission signal from transmission 14 that is sent to controller 48 indicating whether transmission 14 is operating in a forward or reverse mode. Thus, if the mode selector 52 indicates selection of the on-demand mode by the vehicle operator, motor assembly 88 rotates sector plate 86 to locate mode fork 170 in its first mode position when transmission is shifted into a forward gear and to locate mode fork 170 in its third mode position when transmission is shifted into a reverse gear.

Figure 9:
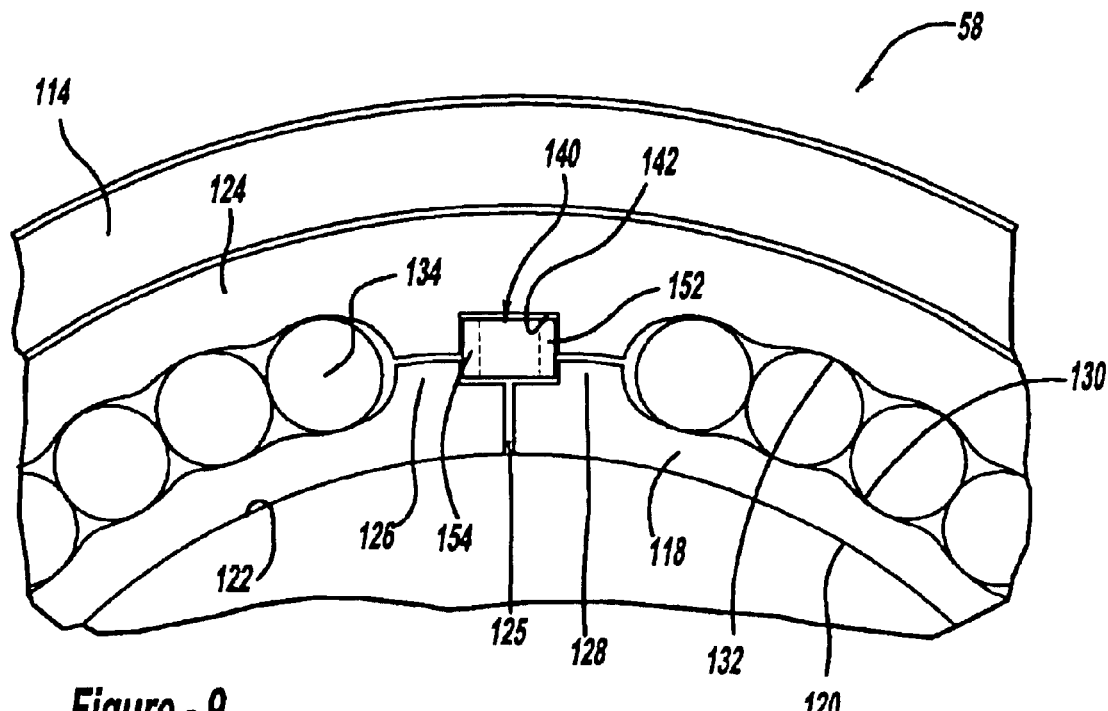
FIGS. 9 and 10 are also similar to FIGS. 3 and 4, respectively, but the mode actuator is shown in a fourth position for establishing a released or two-wheel drive mode.
Figure 10:
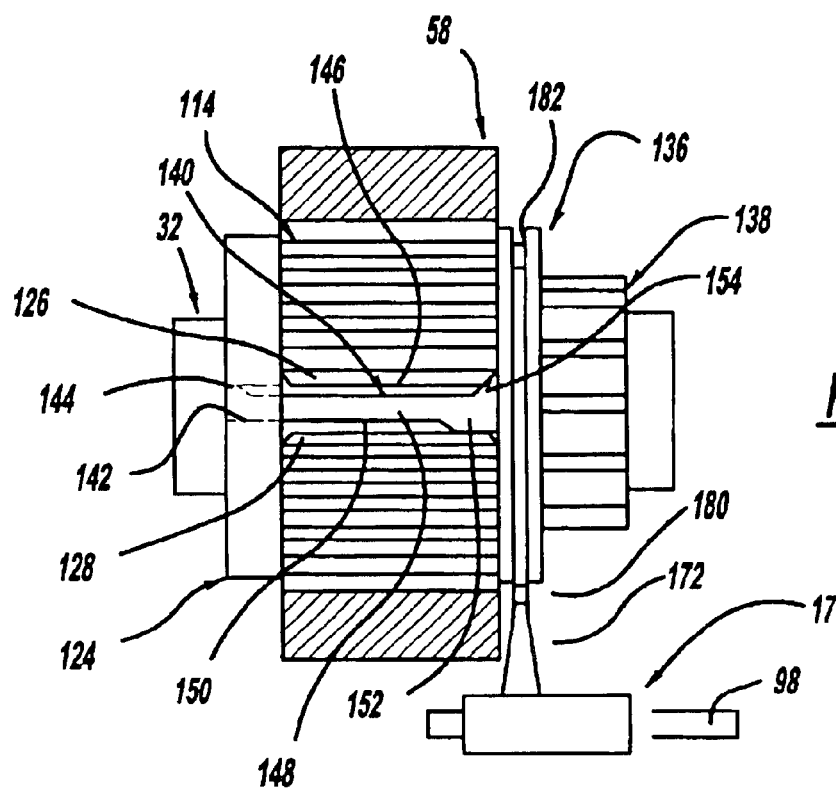

Finally, FIGS. 9 and 10 illustrate actuator ring 136 in its fourth mode position whereat third ramped edge segment 154 is located adjacent to first lug 126 and second ramped edge segment 152 is located adjacent to second lug 128. As such, cam rod 140 maintains central alignment of actuation slot 125 and guide slot 142 to prevent relative rotation between slipper ring 118 and outer ring 124 in both directions. Thus, clutch assembly 58 is maintained in its unlocked condition for permitting overrunning in both directions so as to establish a two-wheel drive mode wherein no drive torque is transferred to front output shaft 32.

The on-demand, part-time four-wheel drive and two-wheel drive modes were all disclosed as being established with range clutch 72 in its H position. However, similar drive modes can be established, if desired, with range clutch 72 in its L position due to the coordinated movement of range fork 76 and mode fork 170 caused by their respective contoured slots in sector plate 86. Typically, however, mode selector 52 will permit the vehicle operator to select from an On-Demand High-Range mode (AUTO) a Part-Time High-Range drive mode (4WH), a Two-Wheel High-Range drive mode (2WH), a Neutral (N) mode, and a Part-Time Low-Range drive mode (4WL). If desired, an On-Demand Low-Range drive mode (AUTO-L) could be provided. Each specific drive mode is established based on the mode signal from mode selector 52 delivered to controller 48 which, in response, activates electric motor assembly 88 to rotate sector plate 86 to a corresponding position. If the 2WH mode is selected, disconnect clutch 46 is actuated to disconnect front propshaft 44 and first output shaft 32 from front differential 38 such that non-driven rotation of front driveline 34 due to rolling of wheels 40 is not transferred to propshaft 44.

Figure 11A:
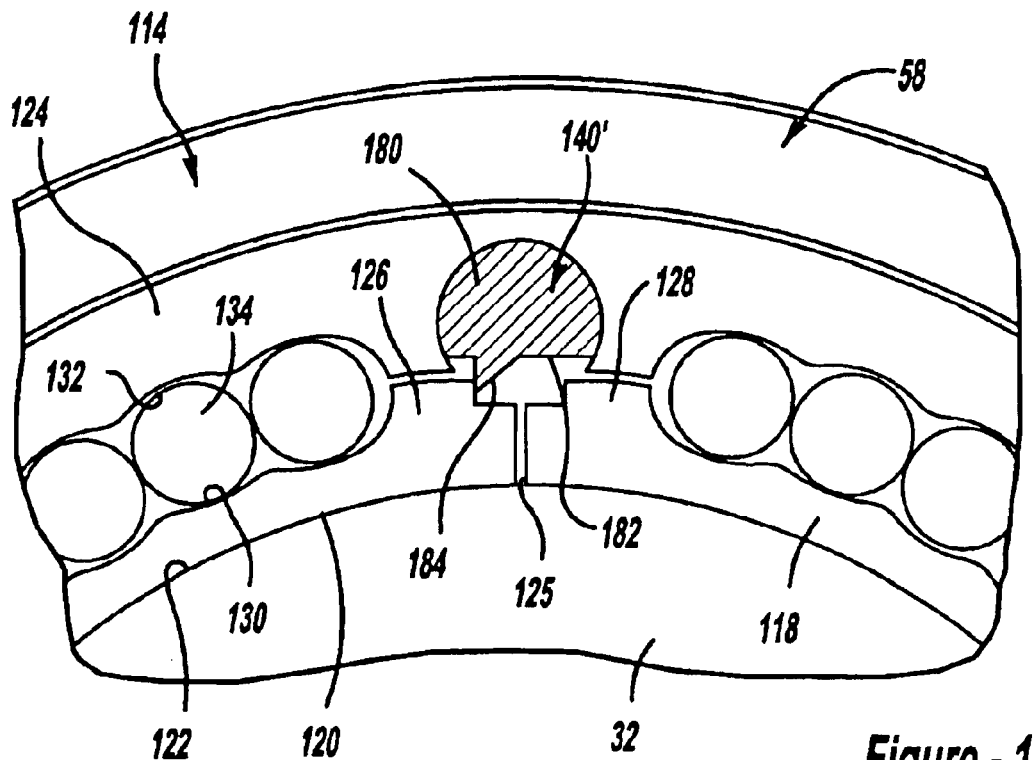
FIGS. 11A through 11D are partial sectional views of the bi-directional clutch assembly of the present invention equipped with an alternative mode actuator shown in each of its four different mode positions.
Figure 11B:
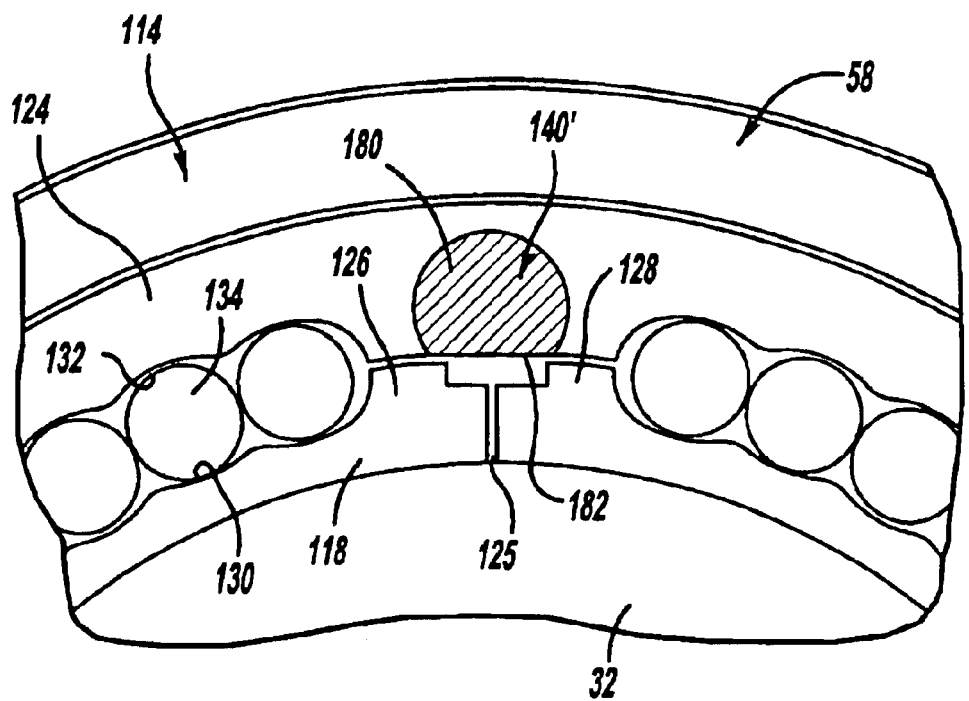
Figure 11C:
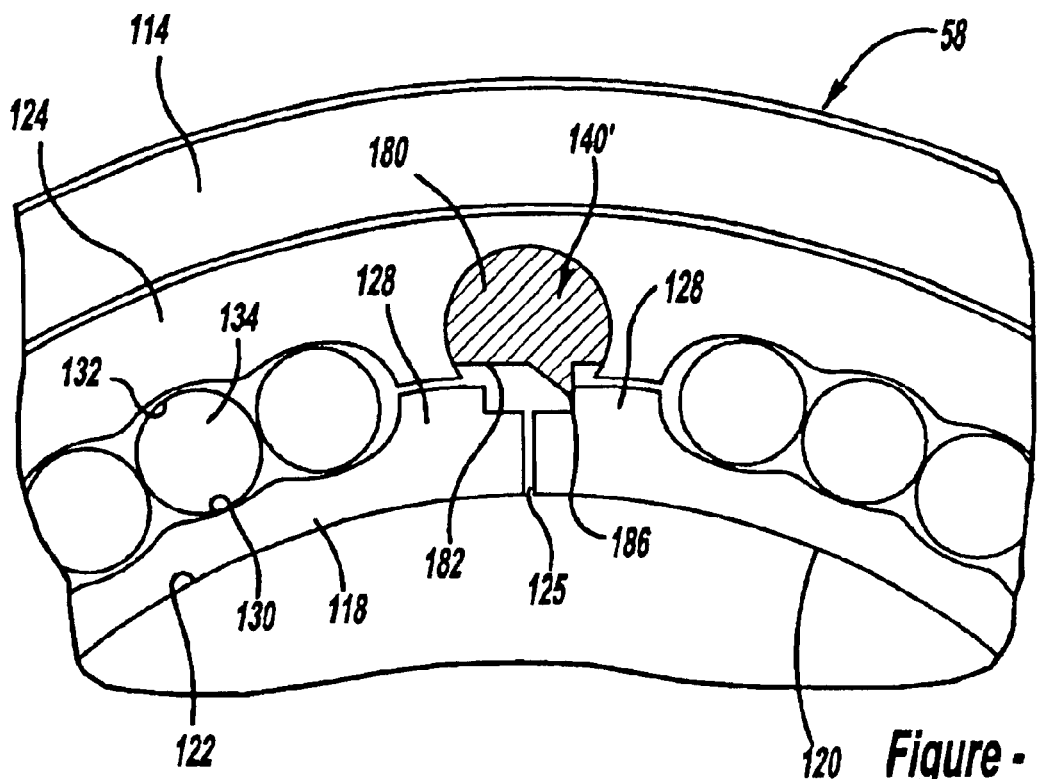
Figure 11D:
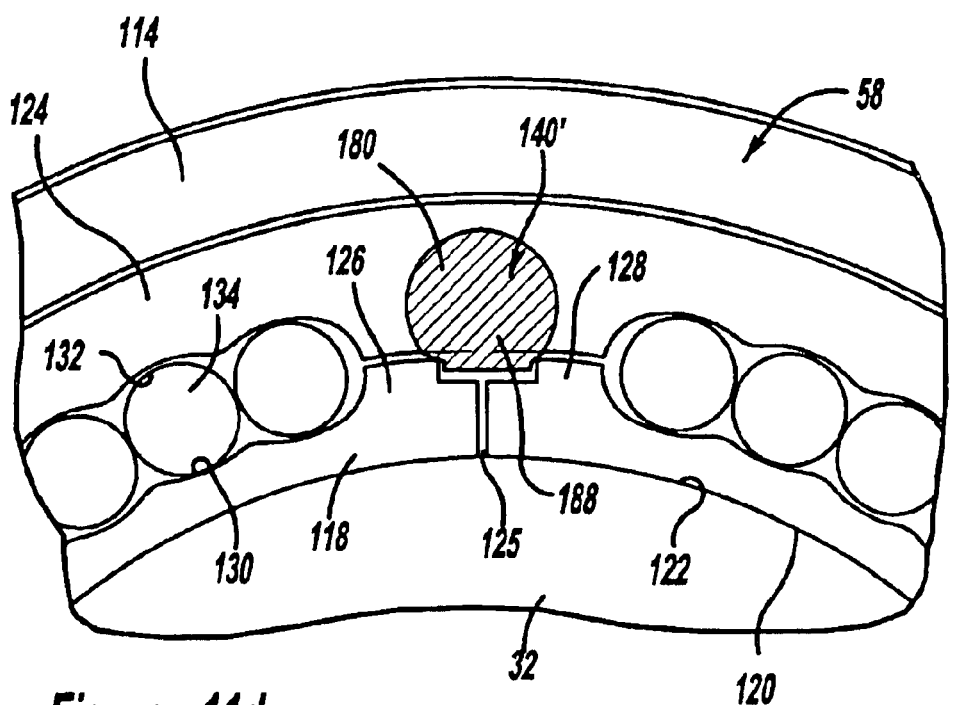

Referring now to FIGS. 11A–11D, a modified cam rod 140' is shown for use with clutch assembly 58. Cam rod 140' includes an elongated cylindrical body segment 180 retained in a similarly shaped guide slot 142' in outer ring. A bottom surface 182 of body segment 180 is formed to include three ramped tabs 184, 186, and 188 which generally correspond in function to ramp segments 144, 152, and 154 of cam rod 140. Specifically, FIG. 11 A shows first tab 184 located adjacent to first lug 126 of slipper ring 118 when cam rod 140' is in the first mode position. A non-lugged segment of bottom surface 182 is positioned as shown in FIG. 11B when cam rod 140' is in its second mode positions. Second tab 186 is shown in FIG. 11C located adjacent to second lug 128 of slipper ring 118 when cam rod 140' is in its third mode position. Finally, FIG. 11D shows third tab 188 located adjacent to both lugs 126 and 128 of slipper ring 118 when cam rod 114' is in its fourth mode position.

Preferred embodiments of the invention have been disclosed to provide those skilled in the art an understanding of the best mode currently contemplated for the operation and construction of the on-demand transfer case. The invention being thus described, it will be obvious that various modifications can be made without departing from the true spirit and scope of the invention, and all such modifications as would be considered by those skilled in the art are intended to be included within the scope of the following claims.

What is claimed is:

1. A transfer case comprising:

an input shaft;

a reduction unit driven by said input shaft and having an output member driven at a reduced speed relative to said input shaft;

first and second output shafts;

a range actuator moveable between first and second range positions to establish corresponding high-range and low-range drive connections between said first output shaft and said input shaft and said output member;

a bi-directional mode clutch having a first ring driven by said first output shaft and a second ring adapted to rotate relative to said first ring for selectively coupling said first ring to said second output shaft, said first ring having a first slot and said second ring having a second slot that is alignable with said first slot to define an actuation chamber having laterally-spaced first and second stop surfaces;

a mode actuator moveable between at least three mode positions, said mode actuator is operable in its first mode position to engage said first stop surface in said actuation chamber so as to permit rotation of said second ring relative to said first ring in a first direction and prevent rotation of said second ring relative to said first ring in a second direction to establish an on-demand four-wheel drive mode, said mode actuator is operable in its second mode position to be displaced from engagement with both of said first and second stop surfaces in said actuation chamber so as to permit rotation of said second ring, relative to said first ring in both directions to establish a part-time four-wheel drive mode, and said mode actuator is operable in its third mode position to engage both of said first and second stop surfaces in said actuation chamber so as to prevent rotation of said second ring relative to said first ring in both directions to establish a two-wheel drive mode;

a shift mechanism for coordinating movement of said range actuator and said mode actuator, said shift mechanism is operable in a first shift position for locating said range actuator in its first range position and said mode actuator in its first mode position to establish an on-demand four-wheel high-range (AUTO) drive mode, said shift mechanism is operable in a second shift position for locating said range actuator in its first range position and said mode actuator in its second mode position to establish a part-time four-wheel high-range (4WH) drive mode, said shift mechanism is operable in a third shift position for locating said range actuator in its first range position and said mode actuator in its third mode position to establish a two-wheel high-range (2WH) drive mode, and said shift mechanism is operable in a fourth shift position for locating said range actuator in its second range position and said mode actuator in its second mode position to establish a part-time four-wheel low-range (4WL) drive mode; and a control system for controlling movement of said shift mechanism.

2. The transfer case of claim 1 wherein said mode actuator is fixed for rotation with one of said first and second rings.

3. The transfer case of claim 1 further comprising a transfer assembly interconnecting said first ring to said first output shaft, said transfer assembly including a first sprocket driven by said first output shaft, a second sprocket fixed to said first ring and operably driven by said first sprocket, said second sprocket arranged to be coaxial with said second output shaft.

4. The transfer case of claim 3 wherein said second ring is radially disposed between said first ring and said second output shaft.

5. The transfer case of claim 1 further comprising a transfer assembly interconnecting said second ring to said second output shaft.

6. The transfer case of claim 1 wherein said first ring has a first cam surface and said second ring has a second cam surface, and said mode clutch further includes rollers disposed in rolling contact with said first, and second cam surfaces, whereby rotation of said second ring relative to said first ring causes said rollers to ride on said cam surfaces and frictionally clamp said second ring to said first ring and said second output shaft.

7. The transfer case of claim 1 wherein said mode actuator includes an actuator rod that is moveable relative to said actuation chamber, said actuator rod includes a first segment adapted to only engage said first stop surface when said mode actuator is in its first mode position, a second segment adapted to be displaced from both of said first and second stop surfaces when said mode actuator is in its second mode position, and a third segment adapted to engage both of said first and second stop surfaces when said mode actuator is located in its third mode position.

8. The transfer case of claim 7 wherein said mode actuator is moveable to a fourth mode position to prevent rotation of said second ring relative to said first ring in said first direction and permit relative rotation therebetween in said second direction, said actuator rod includes a fourth segment adapted to only engage said second stop surface in said actuation chamber when said mode actuator is in its fourth mode position.

9. The transfer case of claim 1 wherein said shift mechanism comprises:
a range fork for moving said range actuator between its two range positions;
a mode fork for moving said mode actuator between its three mode positions;
a movement coordinating member moveable between its four shift positions for causing coordinated movement of said range fork and said mode fork; and
an electric motor for moving said movement coordinating member.

10. The transfer case of claim 9 wherein said control system comprises:
a mode selector for permitting a vehicle operator to selected operation in one of said AUTO, 4WH, 2WH and 4WL drive modes and generate a mode signal indicative of the specific drive mode selected; and
a controller for receiving said mode signal and sending an electric control signal to said electric motor in response to said mode signal for moving said movement coordinating member to said shift position corresponding to the drive mode selected.

11. The transfer case of claim 1 wherein said control system comprises:
a power-operated shift actuator for moving said shift mechanism;
a mode selector permitting an operator to select one of the available AUTO, 4WH, 2WH and 4WL drive modes; and
a controller receiving mode signals from said mode selectors and controlling actuation of said power-operated shift actuator in response to said mode signals.

12. A transfer case comprising:
an input shaft;
a reduction unit driven by said input shaft and having an output member driven at a reduced speed relative to said input shaft;
first and second output shafts;
a range actuator moveable between first and second range positions to establish corresponding high-range and tow-range drive connections between said first output shaft and said input shaft and said output member;
a transfer assembly driven by said first output shaft;
a bi-directional mode clutch having a first ring driven by said transfer assembly and a second ring disposed between said first ring and said second output shaft, said second ring is adapted to rotate relative to said first ring for selectively coupling said first ring to said second output shaft, said first ring having a first slot and said second ring having a second slot that is alignable with said first slot to define an actuation chamber having laterally-spaced first and second stop surfaces;
a mode actuator moveable between three mode positions, said mode actuator is operable in its first mode position to engage said first stop surface in said actuation chamber so as to permit rotation of said second ring relative to said first ring in a first direction and prevent rotation of said second ring relative to said first ring in a second direction to establish an on-demand four-wheel drive mode, said mode actuator is operable in its second mode position to be displaced from engagement with both of said first and second stop surfaces in said actuation chamber so as to permit rotation of said second ring relative to said first ring in both directions to establish a part-time four-wheel drive mode, and said mode actuator is operable in its third mode position to engage both of said first and second stop surfaces in said actuation chamber so as to prevent rotation of said second ring relative to said first ring in both directions to establish a two-wheel drive mode; and
a shift mechanism for coordinating movement of said range actuator and said mode actuator.

13. The transfer case of claim 12 wherein said shift mechanism is operable in a first shift position for locating said range actuator in its first range position and said mode actuator in its first mode position to establish an on-demand four-wheel high-range (AUTO) drive mode, wherein said shift mechanism is operable in a second shift position for locating said range actuator in its first range position and said mode actuator in its second mode position to establish a part-time four-wheel high-range (4WH) drive mode, wherein said shift mechanism is operable in a third shift position for locating said range actuator in its first range position and said mode actuator in its third mode position to establish a two-wheel high-range (2WH) drive mode, and wherein said shift mechanism is operable in a fourth shift position for locating said range actuator in its second range position and said mode actuator in its second mode position to establish a part-time four-wheel low-range (4WL) drive mode.

14. The transfer case of claim 13 further comprising a control system for controlling movement of said shift mechanism.

15. The transfer case of claim 12 wherein said first ring has a first cam surface and said second ring has a second cam surface, and said mode clutch further includes rollers disposed in rolling contact with said first and second cam surfaces, whereby rotation of said second ring relative to said first ring causes said rollers to ride on said cam surfaces and frictionally clamp said second ring to said first ring and said second output shaft.

16. The transfer case of claim 12 wherein said mode actuator includes an actuator rod that is axially moveable relative to said actuation chamber, said actuator rod includes a first segment adapted to only engage said first stop surface when said mode actuator is in its first mode position, a second segment adapted to be displaced from both of said first and second stop surfaces when mode actuator is in its second mode position, and a third segment adapted to engage both of said first and second stop surfaces when said mode actuator is located in its third mode position.

17. The transfer case of claim 16 wherein said mode actuator is moveable to a fourth mode position to prevent rotation of said second ring relative to said first ring in said first direction and permit relative rotation therebetween in said second direction, said actuator rod includes a fourth segment adapted to only engage said second stop surface in said actuation chamber when said mode actuator is in its fourth mode position.

18. The transfer case of claim 14 wherein said shift mechanism comprises:
   a range fork for moving said range actuator between its two range positions;
   a mode fork for moving said mode actuator between its three mode positions;
   a sector plate rotatable between said four shift positions for causing coordinated movement of said range fork and said mode fork; and
   an electric motor for rotating said sector plate.

19. The transfer case of claim 18 wherein said control system comprises;
   a mode selector for permitting a vehicle operator to selected operation in one of said AUTO, 4WH, 2WH and 4WL drive modes and generate a mode signal indicative of the specific drive mode selected; and
   a controller for receiving said mode signal and sending an electric control signal to said electric motor in response to said mode signal for moving said movement coordinating member to the shift position corresponding to the drive mode selected.

20. The transfer case of claim 13 further comprising:
   a power-operated shift actuator for moving said shift mechanism;
   a mode selector permitting an operator to select one of the available AUTO, 4WH 2WH and 4WL drive modes; and
   a controller receiving mode signals from said mode selector and controlling actuation of said power-operated shift actuator in response to said mode signals.

21. A transfer case comprising:
   first and second shafts;
   a bi-directional mode cutch having a first ring driven by said first shaft and a second ring adapted to selectively rotate relative to said first ring for releasably coupling said first ring to said second shaft, said first ring having a first slot and said second ring having a second slot that is alignable with said first slot to define an actuation chamber having laterally-spaced first and second stop surfaces;
   a mode actuator moveable between three mode positions, said mode actuator is operable in its first mode position to engage said first stop surface in said actuation chamber so as to permit rotation of said second ring relative to said first ring in a first direction and prevent rotation of said second ring relative to said first ring in a second direction to establish an on-demand four-wheel drive mode, said mode actuator is operable in its second mode position to be displaced from engagement with both of said first and second stop surfaces in said actuation chamber so as to permit rotation of said second ring relative to said first ring in both directions to establish a part-time four-wheel drive mode, and said mode actuator is operable in its third mode position to engage both of said first and second stop surfaces in said actuation chamber so as to prevent rotation of said second ring relative to said first ring in both directions to establish a two-wheel drive mode; and
   a power-operated shift mechanism for controlling movement of said mode actuator.

22. The transfer case of claim 21 wherein said mode actuator is fixed for rotation with one of said first and second rings.

23. The transfer case of claim 21 further comprising a transfer assembly interconnecting said first ring to said first shaft, said transfer assembly including a first sprocket driven by said first shaft, a second sprocket fixed to said first ring and operably driven by said first sprocket, said second sprocket arranged to be coaxial with said second shaft.

24. The transfer case of claim 23 wherein said second ring is radially disposed between said first ring and said second shaft.

25. The transfer case of claim 21 wherein said first ring has a first cam surface and said second ring has a second cam surface, and said mode clutch further includes rollers disposed in rolling contact with said first and second cam surfaces, whereby rotation of said second ring relative to said first ring causes said rollers to ride on said cam surfaces and frictionally clamp said second ring to said first ring and said second shaft.

26. The transfer case of claim 21 wherein said mode actuator includes an actuator rod that is moveable relative to said actuation chamber, said actuator rod includes a first segment adapted to only engage said first stop surface when said mode actuator is in its first mode position, a second segment adapted to be displaced from both of said first and second stop surfaces when said mode actuator is in its second mode position, and a third segment adapted to engage both of said first and second stop surfaces when said mode actuator is located in its third mode position.

27. The transfer case of claim 26 wherein said mode actuator is moveable to a fourth mode position to prevent rotation of said second ring relative to said first ring in said first direction and permit relative rotation therebetween in said second direction, said actuator rod includes a fourth segment adapted to only engage said second stop surface in said actuation chamber when said mode actuator is in its fourth mode position.

28. The transfer case of claim 21 wherein said shift mechanism comprises:
   a mode fork for axially moving said mode actuator between its three mode positions;
   a drive member for converting rotary movement into axial movement of said mode fork; and
   an electric motor for rotatively driving said drive member.

29. The transfer case of claim 21 wherein a control system comprises:
   a mode selector for permitting a vehicle operator to select operation in one of said drive modes and generate a mode signal indicative of the specific drive mode selected; and
   a controller for receiving said mode signal and sending an electric control signal in response thereto to said electric motor for rotating said drive member to move said mode actuator to the mode position corresponding to the drive mode selected.

30. A transfer case comprising:
an input shaft;
a reduction unit driven by said input shaft and having an output member driven at a reduced speed relative to said input shaft;
first and second output shafts;
a range actuator moveable between first and second range positions to establish corresponding high-range and low-range drive connections between said first output shaft and said input shaft and said output member;
a bi-directional mode clutch having a first ring driven by said first output shaft and a second ring adapted to rotate relative to said first ring for selectively coupling said first ring to said second output shaft, said first ring having a first slot and said second ring having a second slot alignable with said first slot to define an actuation chamber having first and second stop surfaces;
a mode actuator moveable between at least three mode positions, said mode actuator is operable in its first mode position to engage said first stop surface of said actuation slot so as to permit rotation of said second ring relative to said first ring in a first direction and prevent rotation of said second ring relative to said first ring in a second direction for establishing an on-demand four-wheel drive mode, said mode actuator is operable in its second mode position to be displaced from engagement with both of said first and second stop surfaces of said actuation slot so as to permit rotation of said second ring relative to said first ring in both directions for establishing a part-time four-wheel drive mode, and said mode actuator is operable in its third mode position to engage both of said first and second stop surfaces of said actuation slot so as to prevent rotation of said second ring relative to said first ring in both directions for establishing a two-wheel drive mode, said mode actuator including an actuator rod that is moveable relative to said actuation chamber, said actuator rod having a first segment adapted to only engage said first stop surface when said mode actuator is in its first mode position, a second segment adapted to be displaced from both of said first and second stop surfaces when said mode actuator is in its second mode position, and a third segment adapted to engage both of said first and second stop surfaces when said mode actuator is located in its third mode position;
a shift mechanism for coordinating movement of said range actuator and said mode actuator; and
a control system for controlling movement of said shift mechanism.

31. The transfer case of claim 30 wherein said shift mechanism is operable in a first shift position for locating said range actuator in its first range position and said mode actuator in its first mode position to establish an on-demand four-wheel high-range (AUTO) drive mode, said shift mechanism is operable in a second shift position for locating said range actuator in its first range position and said mode actuator in its second mode position to establish a part-time four-wheel high-range (4WH) drive mode, said shift mechanism is operable in a third shift position for locating said range actuator in its first range position and said mode actuator in its third mode position to establish a two-wheel high-range (2WH) drive mode, and said shift mechanism is operable in a fourth shift position for locating said range actuator in its second range position and said mode actuator in its second mode position to establish a part-time four-wheel low-range (4WL) drive mode.

32. The transfer case of claim 31 wherein said control system comprises:
a power-operated shift actuator for moving said shift mechanism;
a mode selector permitting an operator to select one of the available AUTO, 4WH, 2WH and 4WL drive modes; and
a controller receiving mode signals from said mode selectors and controlling actuation of said power-operated shift actuator in response to said mode signals.

33. The transfer case of claim 30 wherein said mode actuator is moveable to a fourth mode position to prevent rotation of said second ring relative to said first ring in said first direction and permit relative rotation therebetween in said second direction, said actuator rod includes a fourth segment adapted to only engage said second stop surface in said actuation chamber when said mode actuator is in its fourth mode position.

34. A transfer case comprising:
first and second shafts;
a bi-directional mode cutch having a first ring driven by said first shaft and a second ring adapted to selectively rotate relative to said first ring for releasably coupling said first ring to said second shaft, said first ring includes a first slot and said second ring includes a second slot that is alignable with said first slot to define an actuation chamber having first and second stop surfaces;
a mode actuator axially moveable between three mode positions, said mode actuator is operable in its first mode position to engage said first stop surface of said actuation slot so as to permit rotation of said second ring relative to said first ring in a first direction and prevent rotation of said second ring relative to said first ring in a second direction for establishing an on-demand four-wheel drive mode, said mode actuator is operable in its second mode position to be displaced from engagement with both of said first and second stop surfaces of said actuation slot so as to permit rotation of said second ring relative to said first ring in both directions for establishing a part-time four-wheel drive mode, and said mode actuator is operable in its third mode position to engage both of said first and second stop surfaces of said actuation slot so as to prevent rotation of said second ring relative to said first ring in both directions for establishing a two-wheel drive mode, said mode actuator including an actuator rod that is moveable relative to said actuation chamber, said actuator rod having a first segment adapted to only engage said first stop surface when said mode actuator is in its first mode position, a second segment adapted to be displaced from both of said first and second stop surfaces when said, mode actuator is in its second mode position, and a third segment adapted to engage both of said first and second stop surfaces when said mode actuator is located in its third mode position; and
a power-operated shift mechanism for controlling movement of said mode actuator.

35. The transfer case of claim 34 further comprising a transfer assembly interconnecting said first ring to said first shaft, said transfer assembly including a first component driven by said first shaft and a second component fixed to said first ring and which is operably driven by said first component.

36. The transfer case of claim 34 wherein said mode actuator is moveable to a fourth mode position to prevent rotation of said second ring relative to said first ring in said first direction and permit relative rotation therebetween in said second direction, said actuator rod includes a fourth segment adapted to only engage said second stop surface in said actuation chamber when said mode actuator is in its fourth mode position.

37. The transfer case of claim 34 wherein said shift mechanism comprises:

a mode fork for axially moving said mode actuator between its three mode positions;

a drive member for converting rotary movement into axial movement of said mode fork; and an electric motor for rotatively driving said drive member.

38. A transfer case comprising:

first and second shafts;

a bi-directional mode clutch having a first ring, driven by said first shaft and a second ring adapted to selectively rotate relative to said first ring for releasably coupling said first ring to said second shaft, said first ring includes a first slot and said second ring includes a second slot that is alignable with said first slot to define an actuation chamber having first and second stop surfaces;

an actuator rod axially moveable between three mode positions and having first, second and third segments, said actuator rod is operable in its first mode position to cause its first segment to engage said first stop surface of said actuation slot so as to permit rotation of said second ring relative to said first ring in a first direction and prevent rotation of said second ring relative to said first ring in a second direction to establish an on-demand four-wheel drive mode, said actuator rod is operable in its second mode position to cause its second segment to be displaced from engagement with both of said first and second stop surfaces of said actuation slot so as to permit rotation of said second ring relative to said first ring in both directions to establish a part-time four-wheel drive mode, and said actuator rod is operable in its third mode position to cause its third segment to engage both of said first and second stop surfaces of said actuation slot so as to prevent rotation of said second ring relative to said first ring in both directions to establish a two-wheel drive mode; and a shift mechanism for controlling movement of said actuator rod.

39. The transfer case of claim 38 wherein said actuator rod is moveable to a fourth mode position to prevent rotation of said second ring relative to said first ring in said first direction and permit relative rotation therebetween in said second direction, whereby said actuator rod includes a fourth segment adapted to only engage said second stop surface in said actuation chamber when said actuator rod is in its fourth mode position.

* * * * *